United States Patent

[11] 3,597,888

| [72] | Inventors | Takeshi Kusakabe;<br>Kenji Suzuki, both of Asahimachi, Japan |
|---|---|---|
| [21] | Appl. No. | 856,614 |
| [22] | Filed | Sept. 10, 1969 |
| [45] | Patented | Aug. 10, 1971 |
| [73] | Assignee | Toyoda Koki Kabushiki Kaisha (trading as Toyoda Machine Works, Ltd.)<br>Aichi Prefecture, Japan |
| [32] | Priority | Sept. 19, 1968, July 9, 1969 |
| [33] | | Japan |
| [31] | | 43/68163 and 44/54279 |

[54] GRINDING MACHINE
13 Claims, 7 Drawing Figs.

[52] U.S. Cl. .................................................. 51/165.73,
51/165.77, 51/165.87, 51/266
[51] Int. Cl. ........................................................ B24b 49/14
[50] Field of Search............................................... 51/165 R,
165.73, 165.77, 165.8, 165.82, 165.83, 165.85,
165.87, 165.88, 165.89, 165.9, 165.91, 165.92,
266

[56] References Cited
UNITED STATES PATENTS
2,310,977  2/1943  Mathys....................... 51/165.87 UX
2,335,100  11/1943  Bauer............................. 51/266 X
2,802,312  8/1957  Gosney et al. ................ 51/165.92
2,984,952  5/1961  Gebel............................ 51/165.90

*Primary Examiner*—Lester M. Swingle
*Attorney*—Hutchinson & Milans

ABSTRACT: A grinding machine comprising a grinding wheel support for rotatably supporting a grinding wheel, a table for supporting a workpiece, means for rapidly moving the grinding wheel support toward and away from the workpiece, and means for moving the grinding wheel support toward the workpiece at a feed speed for rough-grinding operation which is lower than the speed of the means for moving the grinding wheel support toward and away from the workpiece, wherein the grinding wheel support is separated from the workpiece after the rough-grinding operation in order to cool the workpiece, following which the wheel support is advanced to the workpiece for the fine-grinding operation so that the workpiece, which is thermally expanded during the rough-grinding operation, recovers from the expanded condition prior to the fine-grinding operation, whereby a more accurate size of the finished workpiece will be attained.

Patented Aug. 10, 1971

Inventor
TAKESHI KUSAKABE and
KENJI SUZUKI

By Hutchinson & Milans
Attorneys

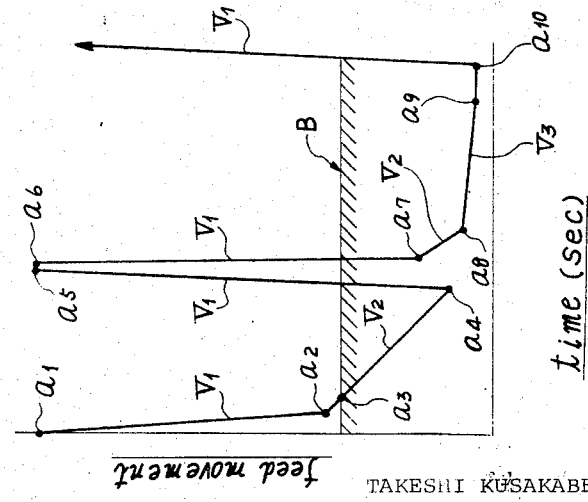

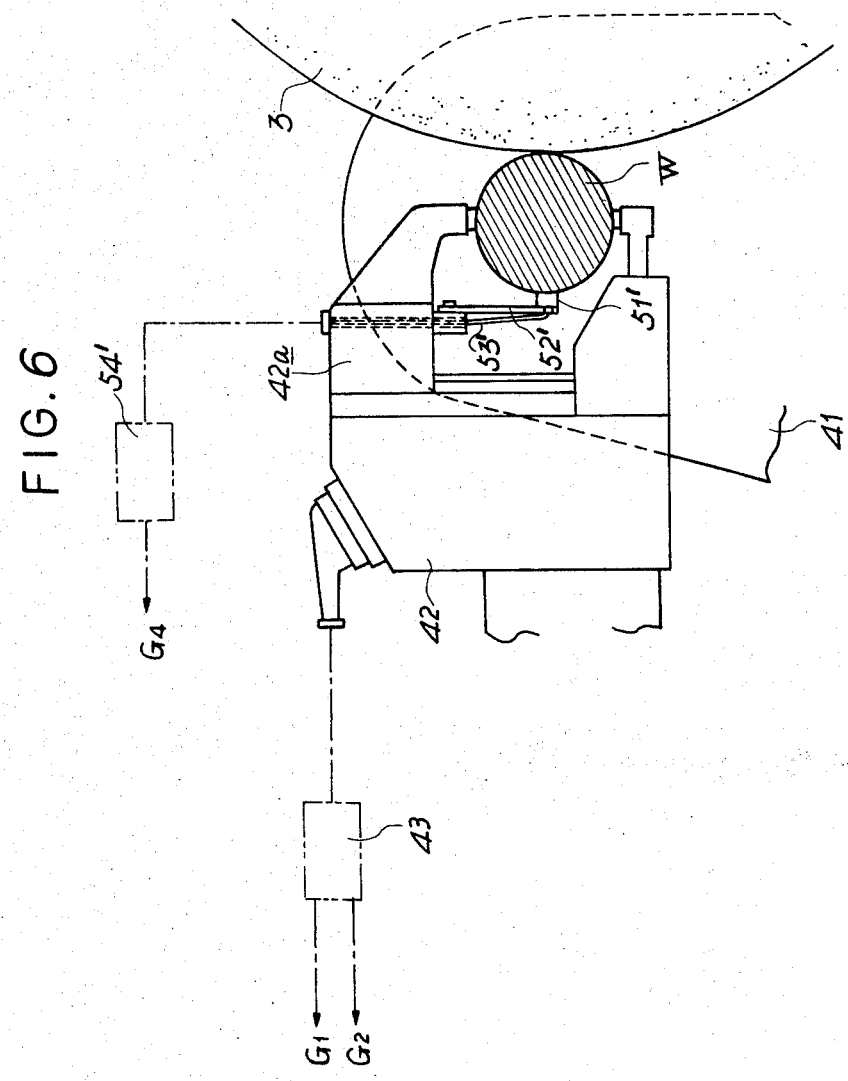

3,597,888

GRINDING MACHINE

BACKGROUND OF THE INVENTION

The present invention relates to grinding machines and more particularly relates to a grinding machine comprising either wheel return means, or wheel stop means, both effective in a high-speed grinding operation.

Recently, due to the necessity for increasing the grinding efficiency, high-speed grinding machines have been adapted with high-speed feeding means for rough grinding. However, in such high-speed grinding machines, the surface temperature of a workpiece will greatly increase. In the conventional apparatus, the sparkout or fine-grinding operation follows the rough-grinding operation under a condition where the temperature of the workpiece is relatively high. Therefore, the fact that the workpiece itself, as well as the feelers of the sizing device, are expanded by thermal influence results in inaccuracies in the finished workpiece size. On the other hand, it is inefficient, in regard to reduction of the cycle time, to hold up the sparkout or fine-grinding operation, after the rough-grinding operation, until the workpiece has naturally cooled to a temperature not affecting the finished size accuracy, which cooling takes a considerable amount of time.

In the meantime it is an inevitable fact in high-speed grinding machines that, due to the feed speed for rough-grinding being considerably increased in order to increase the grinding efficiency of the machine, the workpiece will be ground to less size than that predetermined in the performance of the rough-grinding operation.

Further in a high-speed grinding machine the grain sharpness of which is not dulled during the rough-grinding operation, the wheel is fractured and grains fall off from the wheel under the pressure of the contacting surfaces between the workpiece and the wheel being increased, thereby the peripheral surface of the wheel becomes rough. Accordingly, the desired finished surface of the workpiece is not obtained in the conventional grinding machine.

SUMMARY OF THE INVENTION

Therefore it is a primary object of the present invention to provide a grinding machine for attaining the finished workpiece, with an accurate size, which comprises a grinding wheel moving means for moving the grinding wheel from the grinding position.

Another object of the present invention is to provide a grinding machine comprising wheel return means for moving a grinding wheel, after the rough-grinding operation, from a grinding position to a predetermined position for a selected period, in order to cool the workpiece, and a signal-generating means for again advancing the grinding wheel to the workpiece after said selected period.

Another object of the present invention is to provide a grinding machine comprising wheel return means wherein the workpiece is prevented from being more ground than the predetermined size in a performance of the rough-grinding operation.

Another object of the present invention is to provide a grinding machine comprising wheel position change means for changing a wheel position after the rough-grinding operation where feed speed of the grinding wheel is changed from a rapid feed rate to a reduced feed rate.

A further object of the present invention is to provide a grinding machine comprising a wheel return means for moving a grinding wheel away from a grinding position to a predetermined position for a selected period of time after the rough-grinding operation, and where a wheel-dressing means is employed for dressing the peripheral surface of the wheel during said selected period, and where a wheel position-compensating means for compensating a wheel position with respect to the workpiece is also utilized.

A still further object of the present invention is to provide a grinding machine comprising a wheel stop means for stopping a grinding wheel at a predetermined position for a selected period of time after the rough-grinding operation, and wherein a wheel-dressing means, for dressing the peripheral surface of the wheel during said selected period, and wheel position-compensating means, for compensating a wheel position after the dressing operation by the same amount as the dressed amount of the grinding wheel, are employed.

DESCRIPTION OF THE DRAWINGS

The foregoing and other objects of the present invention will become fully apparent from the following description of some preferred embodiments of the present invention with reference to the accompanying drawings, in which:

FIG. 4 is a grinding cycle diagram of the high-speed grinding machine shown in FIGS. 3 and 7;

FIG. 5 is a diagram illustrating comparable experimental data showing changes of the surface temperature of the workpiece in the case where the grinding wheel is separated from the workpiece to cool the workpiece after the rough-grinding operation and in the case where the sparkout operation is continued without separating the grinding wheel after the rough-grinding operation;

FIG. 6 is a view showing a modified signal-generating means of the grinding machine.

DESCRIPTION OF THE INVENTION

Figure 1:
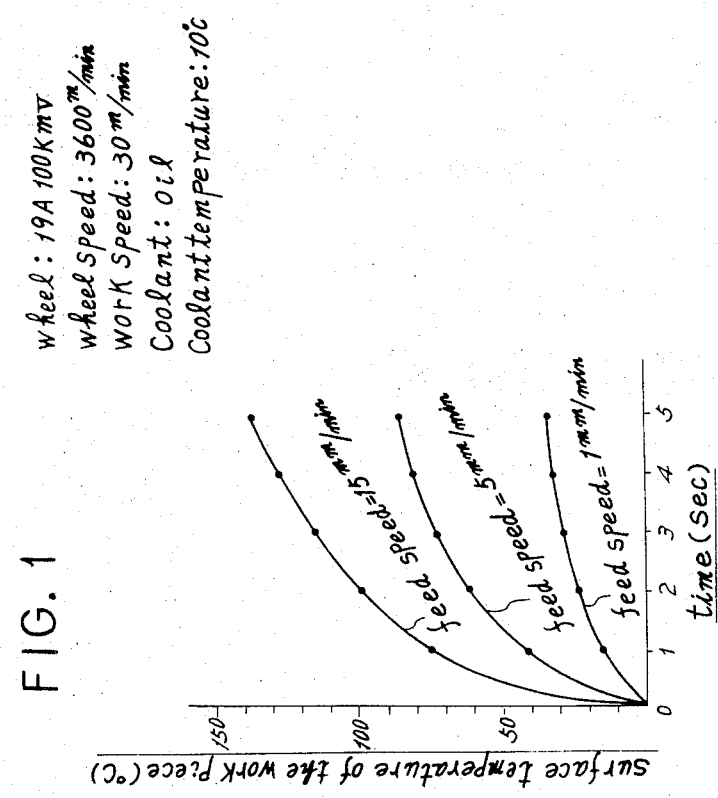
FIG. 1 is a diagram illustrating experimental data showing variation of surface temperature of a workpiece under the change of time and feed speed of a grinding wheel.

Referring now to FIG. 1, the surface temperature of a workpiece, which is shown at a value subtracted by air temperature, rises in accordance with increase in a feed speed of a grinding wheel from 1mm./min. through 5mm./min. to 15mm./min. For example, at the feed speed of 15mm./min., the surface temperature of the workpiece rises to about 115° C. after 3 seconds from the initiating of the grinding operation. The workpiece itself and the feelers of a sizing device being expanded by thermal influence, the surface temperature of the workpiece heated during the rough-grinding operation must be lowered to a temperature which has no influence on the accuracy of the finished size prior to sparkout or the fine-grinding operation.

Figure 2:
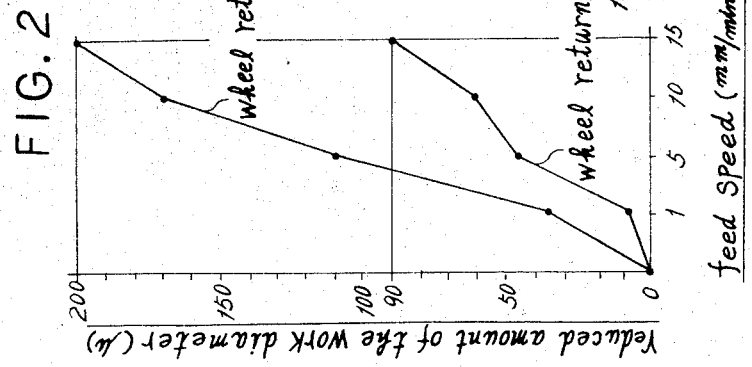
FIG. 2 is a diagram illustrating experimental data showing variation of reduced amount of the workpiece diameter under the change of feed speed of the grinding wheel and wheel return speed thereof from the workpiece.

Referring to FIG. 2, about 90$\mu$ or more amount of the workpiece diameter is much reduced than the amount predetermined to be ground when the grinding wheel is advanced to the workpiece at a speed of 15mm./min. and then immediately returned at a rapid return speed of 15mm./min. On the other hand, about 200$\mu$ or more amount is much reduced than the amount predetermined to be ground when the grinding wheel is advanced to the workpiece at a speed of 15mm./min. and then immediately returned at a return speed of 2mm./min. Therefore, when the feed speed for rough grinding is considerably increased for the purpose of increase in grinding efficiency, the workpiece is more ground than that predetermined. However, according to the present invention the workpiece is prevented from being so excessively ground, since the return speed of the grinding wheel is considerably increased.

Figure 3:
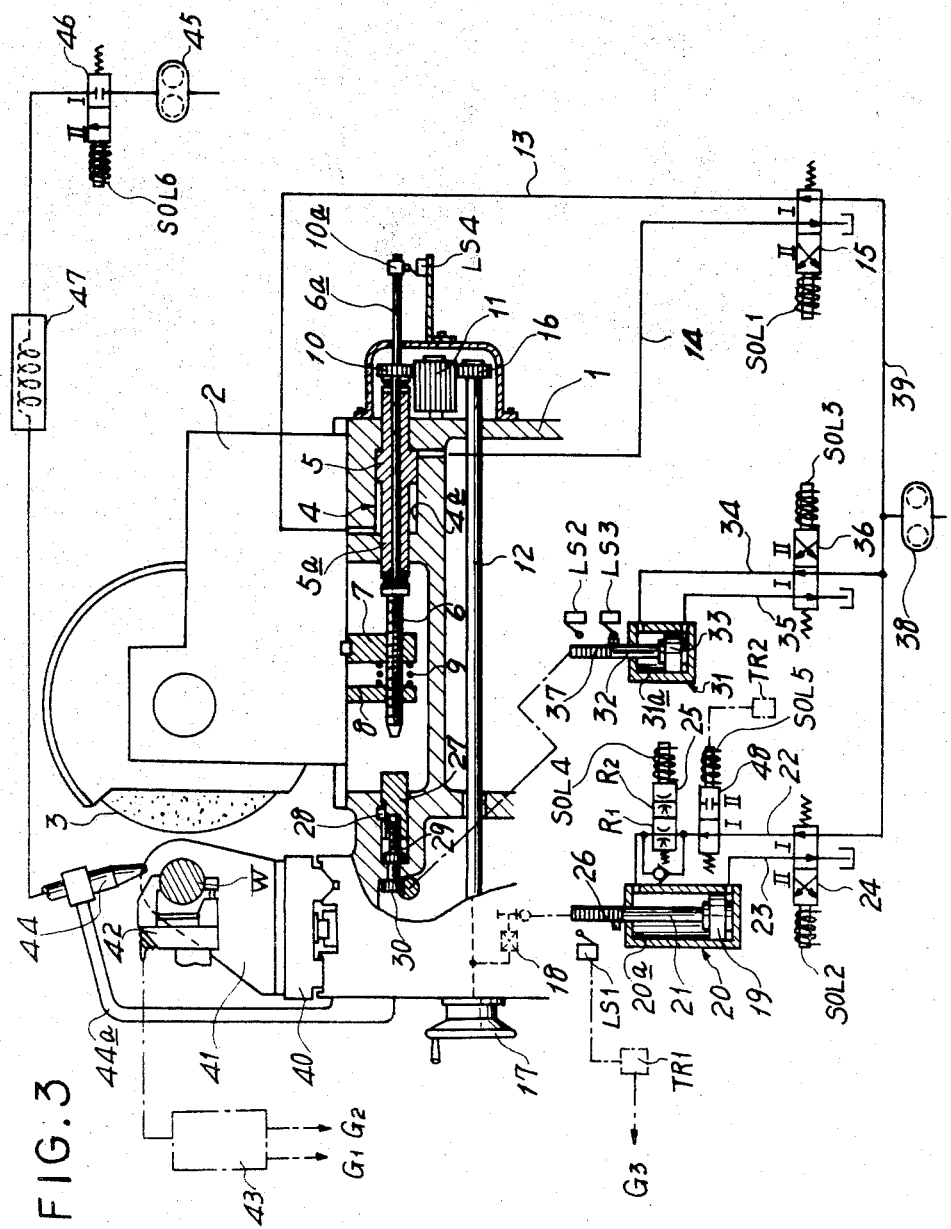
FIG. 3 is a hydraulic diagram showing preferred embodiment of the high-speed grinding machine according to the present invention.

Referring to FIG. 3, showing an initial condition of the grinding operation, on a bed 1 is slidably mounted a wheel support 2 rotatably supporting a grinding wheel 3 thereon. In the bed 1 is mounted a rapid feed hydraulic actuator 4 consisting of a cylinder 4a, a piston 5 slidably mounted in the cylinder and a piston rod 5a. In the piston 5 is rotatably mounted a feed screw 6 which engages with a feed nut 7 secured to the wheel support 2. A spring 9 is seated between the feed nut 7 and a nut 8 to eliminate the backlash between the screw 6 and the nut 7. The rod end and head end of the cylinder 4a are connected to a changeover valve 15 through respective lines 13 and 14. On the right side of the screw 6 is formed a gear 10 which is connected to a gear 16 formed on the right end of a driving shaft 12 through a idle gear 11. On the right end of the gear 10 is formed a rod 6a which carries a dog 10a whereby upon rightward movement of the rod 6a, a limit switch LS4 will be actuated and the wheel support is secured in position as shown. A manually operable handwheel 17 is secured on the left end of the driving shaft 12 for manual feed operation of the wheel 3.

A slow feed hydraulic actuator 20 comprises a cylinder 20a, a piston 19 slidably mounted in the cylinder and a piston rod 21. The driving shaft 12 further operably engages with a rack formed on the piston rod 21 through a clutch 18 provided for either manual or automatic feed movement of the wheel support 2. Rod end and head end of the cylinder 20a are connected to a changeover valve 24 through respective lines 22 and 23. In the line 22, there is provided a flow control changeover valve 25 and a sparkout control changeover valve 48. The piston rod 21 carries a dog 26 whereby upon upward movement of the rod 21 a limit switch LS1 is actuated.

Wheel position change means includes a stop 27 reciprocally but unrotatably mounted opposite the left end of the screw 6 in the bed 1 by means of a key 28 and a screw 29 rotatably but axially unmovably mounted in the bed 1 and engaged with the stop 27, and carrying a gear 30 integrally formed or fixed to the screw 29. A stop movement control hydraulic actuator 31 consists of a cylinder 31a, a piston 33 slidably mounted in the cylinder and a piston rod 32 on which is formed a rack engaged with the gear 30. Rod end and head end of the cylinder 31a are connected to a changeover valve 36 through respective lines 34 and 35. The piston rod 32 carries a dog 37 whereby upon upward movement of the rod 32 a limit switch LS2 is actuated and on the other hand, upon downward movement of the rod 32 a limit switch LS3 is actuated. A delivery port of a pump 38 is connected to the valves 15, 24 and 36 through a line 39.

On the bed 1 is also slidably mounted a table 40 on which a headstock 41 and a tailstock (not shown) are mounted for supporting a workpiece W. A sizing device 42 which engages with the workpiece W is mounted on the table 40. The sizing device 42 generates a first sizing signal G1 and a second sizing signal G2 through a control circuit 43 in accordance with the finished size of the workpiece W. A coolant nozzle 44 facing the workpiece W is secured to the bed 1 by a supporting arm 44a. A delivery port of a coolant pump 45 is connected to the coolant nozzle 44 through a changeover valve 46 and a cooler 47 for cooling the coolant.

The operation of the grinding machine of the above mentioned embodiment will be described with reference to FIG. 4 showing a grinding cycle.

When a start switch is pressed, the grinding wheel 3 starts to rotate and at the same time the pump 38 and the coolant pump 45 deliver pressure fluid and the coolant respectively. Bypressing a cycle start switch, solenoids SOL1 and SOL2 are energized to change the valves 15 and 24 respectively to positions indicated at II whereby pressure fluid is simultaneously supplied from the pump 38 to the head ends of the cylinders 4a and 20a through the lines 14 and 23. At the same time a solenoid SOL6 is also energized to change the valve 46 to a position indicated at II whereby the coolant from the coolant pump 45 is supplied to the coolant nozzle 44 through the cooler 47.

The wheel support 2 supporting the grinding wheel 3 is advanced toward the workpiece W, that is referring to FIG. 4, from a point a1 to a point a2 at a rapid feed speed $V_1$, by the pistons 5 and 19, and then upon engagement of the left end of the feed screw 6 with the stop 27 of the wheel position change means at the point a2 the grinding wheel 3 is advanced at a reduced feed speed $V_2$ for rough grinding, by the movement of piston 19. The reduced speed $V_2$ is determined by a resistance R1 of the flow control valve 25 and is set to about 15mm./min. for the purpose of increase in grinding efficiency. The grinding wheel fed at the speed $V_2$ engages the work surface B at a point a3 for rough grinding. At a point a4 the dog 26 carried on the piston rod 21 actuates the limit switch LS1 to deenergize the solenoids SOL1 and SOL2 to change the valves 15 and 24 to positions indicated at I. Whereupon, the pistons 5 and 19 are returned to the positions shown in FIG. 3, thereby returning the grinding wheel 3 from the point a4 to a point a5 at the rapid return speed $V_1$.

On the separation of the grinding wheel 3 from the workpiece W the heat being generated in the workpiece W due to the rough-grinding operation is stopped and the coolant, cooled by the cooler 47, is continually supplied to the workpiece so that the workpiece heated during the rough-grinding operation is effectively cooled. Further, by the actuation of the limit switch LS1, a timer TR1 is energized and simultaneously a solenoid SOL3 is energized to change the valve 36 to a position indicated at II permitting pressure fluid from the pump 38 to be admitted into the head end of the cylinder 31a through the line 35. The piston 33 is thus moved upward which effects the leftward movement of the stop 27 through the adjusting screw 29 by a predetermined distance.

When the timer TR1 is timed out to generate a signal G3 at a point a6, the solenoids SOL1 and SOL2 are reenergized to change the valves 15 and 24 to the positions indicated at II, thereby the grinding wheel 3 is again advanced toward the workpiece W; that is, from the point a6 to a point a7, at the rapid feed speed $V_1$. Upon the contact of the left end of the feed screw 6 with the stop 27 at the point a7, the grinding wheel 3 is advanced from the point a7 to a point a8 at the reduced feed speed $V_2$. Between the points a7 and a8 where the grinding wheel is set to grind the amount left to be ground during the rough-grinding operation due to the deflection of the workpiece, the workpiece, which was cooled by the coolant during returning of the grinding wheel, is again heated but only to such a small degree that the finished workpiece will be of an accurate size on completion of the succeeding fine-grinding operation.

When the sizing device 42 generates the first sizing signal G1 at the point a8, a solenoid SOL4 is energized to change the valve 25 so that the reduced feed speed $V_2$ is changed to a further reduced speed $V_3$ suitable for fine grinding determined by a resistance R2 of the flow control valve 25. The further reduced speed $V_3$ is usually set to about 0.2mm./min. Thus, the workpiece is ground finely. When the sizing device 42 generates the second sizing signal G2 at a point a9, a solenoid SOL5 is energized to change the valve 48 to a position indicated at II and to energize a sparkout timer TR2, thereby stopping the movement of the piston 19. Thus a sparkout operation is effected from the point a9 to a point a10.

When the sparkout timer TR2 is timed out, the solenoids SOL1, SOL2, SOL3, SOL4 and SOL5 for the respective valves 15, 24, 36, 25 and 48 are all deenergized to return the grinding wheel 3, the pistons 5, 19 and 33 to their initial positions as shown in FIG. 3. When the dog 10a actuates the limit switch LS4, a solenoid SOL6 is deenergized to change the valve 46 to a position indicated at I so that coolant is not supplied to the coolant nozzle 44. Thus, the cycle of grinding the workpiece W is completed.

Referring to FIG. 5, the surface temperature of the workpiece in two cases, which is shown at a value subtracted by air temperature, is indicated. The solid line represents the case where the grinding wheel is separated and returned from the workpiece for 10 seconds after the rough-grinding operation, and the broken line indicates the case where the sparkout operation is continued for 10 seconds prior to the fine-grinding operation after the rough-grinding operation. The surface temperature of the workpiece rises to about 50° C. after 3 seconds from the initiating of the rough-grinding operation at the feed speed of 3mm./min. Then the temperature falls to about 3° C. after 10 seconds when the grinding wheel is separated and returned from the workpiece to cool the workpiece. However, the surface temperature falls only to about 12° C. when the sparkout operation is continued. Likewise, the surface temperature rises to about 115° C. after 3 seconds from the initiating of the rough-grinding operation at the feed speed of 15mm./min., and then falls to about 6° C. after further 10 seconds when the grinding wheel is separated and returned from the workpiece. However, the surface temperature falls to only about 20° C. when the sparkout operation is continued.

Thus, when the sparkout operation is continued after the rough-grinding operation, the fine-grinding operation is seriously effected under the less cooling effect, which results in a poorer finished size accuracy. On the other hand, it will apparently be understood that when the grinding wheel is separately returned from the workpiece, the surface temperature of the workpiece, which has risen during the rough-grinding operation, is so effectively lowered that the succeeding fine-grinding operation is effected in a greatly improved environment and condition.

Referring to FIG. 6 which is a view showing a modified signal-generating means, the grinding wheel is kept separated from the workpiece until the surface temperature of the workpiece is lowered to a predetermined temperature, which is sensed by suitable sensing means. In the grinding machine in FIG. 3 the grinding wheel is kept returned until the timer TR1 is timed out to generate the signal G3.

A measuring element 51' for measuring surface temperature of the workpiece is secured to a fixed finger 42a of the sizing device 42, which is of the same type as that shown in FIG. 3, through a plate spring 52' so as to contact the peripheral surface of the workpiece W. A thermoelectric couple, such as the combination of iron and constantan which generates electromotive force proportional to changes of temperature, is generally used as the measuring element. The measuring element 51' is connected through lead wires 53' to a control circuit 54' which generates a signal G4 when the surface temperature of the workpiece W is lowered to the predetermined temperature. The grinding wheel is again advanced toward the workpiece from the point a6 in response to the signal G4. According to the machine of the above-mentioned embodiment, the cooling condition of the surface of the workpiece may be accurately sensed, because the temperature of the workpiece is directly measured by the measuring element.

In the present invention the workpiece heated during rough-grinding operation may be effectively cooled. The grinding wheel is separately returned from the workpiece for a selected period after the rough-grinding operation and the coolant, cooled by the cooler 47, is continually supplied to the workpiece. It has been a long-standing problem to lessen the error in the finished size, brought about by the thermal influence produced during the rough-grinding operation, in the succeeding fine-grinding operation. This problem may be solved by the present invention. In particular, the present invention is effective in the high-speed grinding machines which grind a large amount of the workpiece, wherein the workpiece is highly heated during the rough-grinding operation. Moreover, it is an important feature that the grinding wheel is rapidly returned from the workpiece after the rough-grinding operation for avoiding any excess of the workpiece being ground by rough grinding than the predetermined amount. According to the present invention, fine surface and accurate size of the finished workpiece may be accomplished.

Though in the above mentioned embodiment, the grinding wheel has been described as being returned to its initial position after the rough-grinding operation, it will be understood that it is not necessary to return it completely thereto. The mere separation of the grinding wheel from the workpiece will accomplish the objects of the invention.

Therefore, instead of the grinding wheel being returned from the point a4 to a5 at the return speed of $V_1$, the grinding wheel may be returned at the speed of $V_2$. Moreover, the coolant nozzle, which is shown as operably secured to the bed in FIG. 3, may be operably secured to the wheel support in the case where the grinding wheel may be separated from the workpiece by only a small distance.

Figure 7:
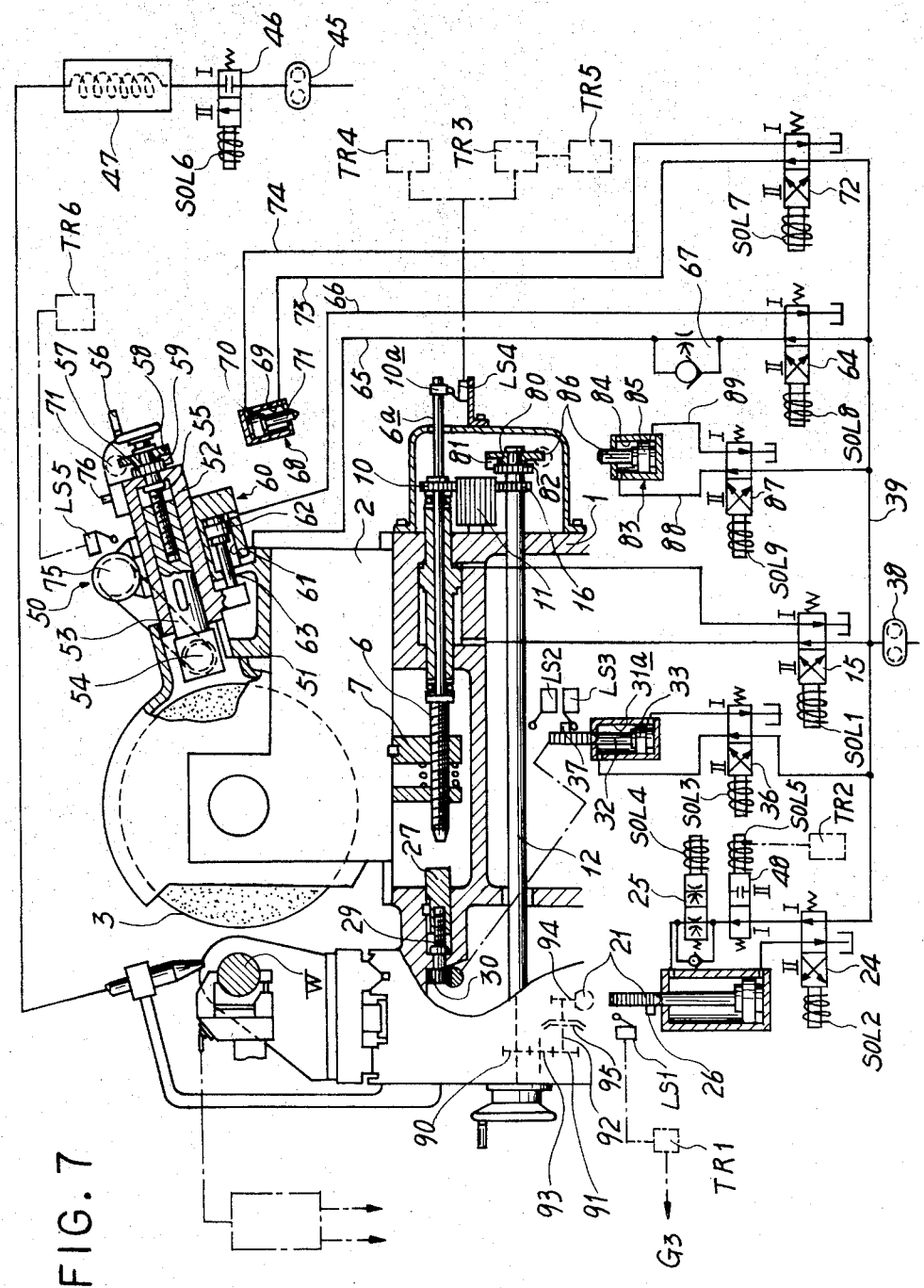
FIG. 7 is a hydraulic diagram showing another preferred embodiment of the high-speed grinding machine according to the present invention.

FIG. 7 is a hydraulic diagram showing another embodiment. Since the hydraulic diagram in FIG. 7 is substantially similar to that in FIG. 3, only different parts will be described. FIG. 7 shows an initial condition of the grinding operation. A wheel dressing or truing apparatus for the wheel 3 is indicated by the reference numeral 50. The dressing apparatus 50 comprises a base 51 fixedly mounted on the wheel support 2, a dressing housing 52 slidably mounted on the base 51, a spindle 53 unrotatably but longitudinally movably mounted in the housing 52, a rotary-dressing tool 54 supported at one end of the spindle 53 and a screw 55 rotatably mounted in the housing 52 but fixed against longitudinal movement therein and engaged with the other end of the spindle 53. On the upper end of the screw 55 is provided a manually operable handwheel 56 for manual adjustment of the feeding movement of the spindle 53. A ratchet wheel 57 is fixedly mounted on the screw 55 and adjacent thereto is rotatably mounted a pivotable member 58 which is provided with a ratchet pawl 59 for engaging with the ratchet wheel 57. The ratchet wheel 57 and the screw 55 are automatically rotated only to advance the dressing tool 54 toward the wheel 3 by a dressing amount.

In the base 51 is provided a hydraulic dressing actuator 60 consisting of a cylinder 61, a piston 62 slidably mounted therein and a piston rod 63 secured to the projected portion of the dressing housing 52. Rod end and head end of the cylinder 61 are connected to a changeover valve 64 through respective lines 65 and 66. The line 65 is provided with a throttle valve 67.

A hydraulic actuator 68 is provided for operably rotating the screw 55 to advance the dressing tool 54 toward the wheel 3 by a dressing amount. This hydraulic actuator 68 comprises a cylinder 69, a piston 70 slidably mounted in the cylinder, and a piston rod 71 engaging with the pivotable member 58. Rod end and head end of the cylinder 69 are connected to a changeover valve 72 through respective lines 73 and 74. A hydraulic motor 75 is operably mounted on the dressing housing 52 to rotate the rotary-dressing tool 54. On the dressing housing 52 is carried a dog 76 to actuate a limit switch LS5 when the dressing housing is advanced toward the wheel 3 by means of the actuator 60.

On the right end of the drive shaft 12 is rotatably mounted a pivotable member 80 which is provided with a ratchet pawl 81. Adjacent to the pivotable member 80, a ratchet wheel 82 is fixedly mounted on the drive shaft 12 and engageable with the ratchet pawl 81 for compensating the position of the wheel 3. The ratchet wheel 82 is rotated only to advance the wheel 3 toward the workpiece W by a compensating amount through the drive shaft 12, the gears 16, 11 and 10, the screw 6 and the nut 7. The compensating amount is set to be the same as said dressing amount. For compensating the position of the wheel 3 there is provided a hydraulic compensating actuator 83 consisting of a cylinder 84, a piston 85 slidably mounted therein and a piston rod 86 engaging with the pivotable member 80. Rod end and head end of the cylinder 84 are connected to a changeover valve 87 through respective lines 88 and 89.

Near the left end of the drive shaft 12 is mounted a gear 90 engaged with a gear 91 mounted on a shaft 92 through an idle gear 93. On the right end of the shaft 92 is mounted a gear 94 engaged with the rack formed on the piston rod 21 of the actuator 20. Intermediate the ends of the shaft 92 there is provided a hydraulically operated clutch 95 for either manual or automatic feed movement of the wheel support 2. The clutch 95 is usually engaged and is automatically disengaged when the compensating actuator 83 is actuated.

The operation of the grinding machine of the above embodiment in FIG. 7 is substantially similar to that of the embodiment in FIG. 3 with the exception of the operation from the point a5 to a7 in FIG. 4. Thus, the operation of the embodiment in FIG. 7 will be described between the positions from the point a5 to a7 in FIG. 4.

At the position of the point a5, the dog 10a carried by the rod 6a actuates the limit switch LS4 to energize a solenoid SOL7 to change the valve 72 to a position indicated at II, to hydraulically disengage the clutch 95 and to energize timers TR3 and TR4. When the timer TR3 is timed out after the disengagement of the clutch 95, a solenoid SOL9, is energized to change the valve 87 to a position indicated at II and a timer TR5 is energized. By the change of the valve 87 to the position II, pressure fluid from the pump 38 is admitted into the head end of the cylinder 84 through the line 89 to compensate the position of the wheel 3 with respect to the workpiece W. After the completion of the compensating step the timer TR5 is timed out to deenergize the solenoid SOL9 to change the valve 87 to a position I and to reengage the clutch 95. Thus, the piston rod 86 of the actuator 83 is returned to the position shown in FIG. 7.

By the change of the valve 72 to the position II, pressure fluid from the pump 38 is admitted into the head end of the cylinder 69 through the line 74, thereby advancing the wheel-dressing tool 54 toward the wheel 3 by the desired dressing amount. After the completion of advancing of the tool 54, the timer TR4 is timed out to energize a solenoid SOL8 to change the valve 64 to a position II. Thus, pressure fluid from the pump 38 is admitted into the head end of the cylinder 61 through the line 66 and exhaust fluid is restricted through the throttle valve 67 in the line 65. The dressing housing 52 is fed at a speed determined by the throttle valve 67 to dress the peripheral surface of the wheel 3. Due to this dressing step, the diameter of the wheel is decreased by the desired dressing amount. However, the position of the wheel 3 being compensated by the same amount as the dressed amount, the position of the wheel 3 with respect to the workpiece W is in the same relation thereto as before dressing. After dressing, the dog 76 carried on the dressing housing 52 actuates the limit switch LS5 to energize a timer TR6.

After the piston rod 86 in the cylinder 85 of actuator 83 has been returned to the position shown in FIG. 7 and the clutch 95 is reengaged, the timer TR6 is timed out to energize the solenoids SOL7 and SOL8 to change the valves 72 and 64 to their respective positions I whereby the piston rods 71 and 63 are respectively returned to the positions shown in FIG. 7. On the separation of the dog 76 from the limit switch LS5, the solenoid SOL3 is energized to change the valve 36 to the position II, and pressure fluid from the pump 38 is admitted into the head end of the cylinder 31a. Thus, the piston 33 is moved upward thereby the stop 27 is moved leftward through the screw 29 by a predetermined length. When the dog 37 carried on the piston rod 32 actuates the limit switch LS2, the solenoids SOL1 and SOL2 are again energized to change the valves 15 and 24 to the respective positions II and the grinding wheel 3 is again advanced toward the workpiece W from the point a6 to the point a7 at the rapid feed speed $V_1$.

The workpiece heated during the rough-grinding operation is effectively cooled by the coolant continually supplied thereto and cooled by the cooler during returning of the grinding wheel therefrom, and the peripheral surface of the wheel, rendered rough due to the fracture of the grinding wheel grains during the rough-grinding operation wherein feed speed is considerably increased, is dressed by the wheel-dressing apparatus after the rough-grinding operation and the wheel position with respect to the workpiece is compensated in the same relation thereto as before dressing. Therefore, a fine finish and accurate size of the workpiece is obtained in the succeeding fine-grinding operation. This is particularly advantageous in high-speed grinding.

Though in the above mentioned embodiment the grinding wheel is returned to its initial position of the grinding operation after the rough-grinding operation, the mere separation of the grinding wheel from the workpiece will accomplish the objects of the invention as in the first embodiment. When the grinding wheel is fed toward the workpiece, that is, the position of the point a4 in FIG. 4, the dog 26 carried on the piston rod 21 actuates the limit switch LS1 to energize the solenoids SOL5 and SOL7. Through the energization of the solenoid SOL5, the valve 48 is changed to the position II to stop the feed movement of the wheel 3. By the energization of the solenoid SOL7, the valve 72 is changed to the position II to advance the tool 54 toward the wheel 3 by the dressing amount. After advancing of the tool 54, the solenoid SOL8 is energized for changing the valve 64 to the position II to dress the wheel 3. Thus the diameter of the wheel is reduced by the dressing amount. At this time the solenoid SOL9 is not energized to change the valve 87 to the position II, and accordingly the wheel position is not compensated with respect to the workpiece. Therefore, the grinding wheel is out of contact with the workpiece, and consequently the workpiece is sufficiently cooled with the coolant continually supplied thereto. After dressing, the solenoid SOL5 is deenergized to change the valve 48 to the position I to again advance the grinding wheel toward the workpiece for fine grinding. When the fine-grinding operation is completed and the grinding wheel is removed to its initial position as shown in FIG. 7, the clutch 95 is disengaged and then the solenoid SOL9 is energized to change the valve 87 to the position II whereby the wheel position is compensated by a compensating amount corresponding to the dressing amount.

While the invention has been described by means of specific examples and specific embodiments, it should be understood that the novel characteristic of the invention may be incorporated in the other structural forms without departing from the spirit and scope of the invention as defined in the following claims.

What we claim is:

1. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, feed means for movement of the grinding wheel toward and from the workpiece, wheel return means for actuating said feed means to separately return the grinding wheel for a selected period from a grinding position on the workpiece to a predetermined position after the rough-grinding operation by said feed means, and means for generating a signal after said selected period to again advance the grinding wheel toward the workpiece for fine grinding.

2. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, feed means for movement of the grinding wheel toward and from the workpiece, wheel return means for actuating said feed means to separately return the grinding wheel from a grinding position on the workpiece to a predetermined position after the rough-grinding operation by said feed means, and means for measuring surface temperature of the workpiece, said measuring means generating a signal to again advance the grinding wheel toward the workpiece for fine grinding when the surface of the workpiece is cooled to a predetermined temperature.

3. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said rapid feed means to separately return the grinding wheel at the rapid feed rate for a selected period from a grinding position on the workpiece to a predetermined position after the rough-grinding operation, and means for generating a signal after said selected period to again advance the grinding wheel toward the workpiece for fine grinding.

4. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said rapid feed means to separately return the grinding wheel at the rapid feed rate from a grinding position on the workpiece to a predetermined position after the rough-grinding operation, and means for measuring surface temperature of the workpiece, said measuring means generating a signal to again advance the grinding wheel toward the workpiece for fine grinding when the surface of the workpiece is cooled to a predetermined temperature.

5. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said reduced feed means to separately return the grinding wheel at the reduced feed rate for a selected period from a grinding position on the workpiece to a predetermined position after the rough-grinding operation, and means for generating a signal after said selected period to again advance the grinding wheel toward the workpiece for fine grinding.

6. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said reduced feed means to separately return the grinding wheel at the reduced feed rate from a grinding position on the workpiece to a predetermined position after the rough-grinding operation, and means for measuring surface temperature of the workpiece, said measuring means generating a signal to again advance the grinding wheel toward the workpiece for fine grinding when the surface of the workpiece is cooled to a predetermined temperature.

7. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said rapid feed means to separately return the grinding wheel at the rapid feed rate for a selected period from a grinding position on the workpiece to a predetermined position after the rough-grinding operation, wheel position change means for changing a position of the grinding wheel after the rough-grinding operation, means at said position of the grinding wheel to change the feed speed of the wheel from the rapid feed rate to the reduced feed rate, and means for again advancing the grinding wheel after said selected period toward the workpiece for fine grinding.

8. A grinding machine comprising a bed, a wheel support mounted on said bed, a grinding wheel rotatably supported on said wheel, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said reduced feed means to separately return the grinding wheel at the reduced feed rate for a selected period from a grinding position on the workpiece to a predetermined position after the rough-grinding operation, wheel position change means for changing a position of the grinding wheel after the rough-grinding operation, means at said position of the grinding wheel to change the feed speed of the wheel from the rapid feed rate to the reduced feed rate, and means for again advancing the grinding wheel after said selected period toward the workpiece for fine grinding.

9. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, feed means for movement of the grinding wheel toward and from the workpiece, wheel return means for actuating said feed means to separately return the grinding wheel for a selected period from a grinding position on the workpiece to a predetermined position after the rough-grinding operation by said feed means, wheel-dressing apparatus for dressing the peripheral surface of the wheel during said selected period, wheel position-compensating means for compensating a wheel position with respect to the workpiece in the same relation thereto as before dressing during said selected period, and means for again advancing the grinding wheel after said selected period toward the workpiece for fine grinding.

10. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said rapid feed means to separately return the grinding wheel at the rapid feed rate for a selected period from a grinding position on the workpiece to a predetermined position after the rough-grinding operation, wheel-dressing apparatus for dressing the peripheral surface of the wheel during said selected period, wheel position-compensating means for compensating a wheel position with respect to the workpiece in the same relation thereto as before dressing during said selected period, and means for again advancing the grinding wheel after said selected period toward the workpiece for fine grinding.

11. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel return means for actuating said reduced feed means to separately return the grinding wheel at the reduced feed rate for a selected period from a grinding position on the workpiece to a predetermined position after the rough-grinding operation, wheel-dressing apparatus for dressing the peripheral surface of the wheel during said selected period, wheel position-compensating means for compensating a wheel position with respect to the workpiece in the same relation thereto as before dressing during said selected period, and means for again advancing the grinding wheel after said selected period toward the workpiece for fine grinding.

12. A grinding machine comprising a bed, a wheel support mounted on said bed, a grinding wheel rotatably supported on said wheel support, a table mounted on said bed operably to support a workpiece, cooling means including a cooler for cooling coolant to continually cool the workpiece throughout a grinding operation, feed means for movement of the grinding wheel toward and from the workpiece, wheel stop means for actuating said feed means to stop the grinding wheel for a selected period at a grinding position on the workpiece after the rough-grinding operation due to said feed means, wheel-dressing apparatus for dressing the peripheral surface of the wheel by a dressing amount during said selected period, means for again advancing the grinding wheel after said selected period toward the workpiece for fine grinding, and wheel position-compensating means for compensating a wheel position by a compensating amount as same as said dressing amount after fine grinding.

13. A grinding machine comprising a bed, a wheel support mounted on said bed, a grinding wheel rotatably supported on said wheel support, a table mounted on said bed operably to support a workpiece, cooling means including a coolant for cooling coolant to continually cool the workpiece throughout a grinding operation, rapid feed means for movement of the grinding wheel toward and from the workpiece at a rapid feed rate, reduced feed means for advance of the grinding wheel to the workpiece at a reduced feed rate for rough grinding, wheel stop means for actuating said reduced feed means to stop the grinding wheel for a selected period at a grinding position on the workpiece after the rough-grinding operation, wheel-dressing apparatus for dressing the peripheral surface of the wheel by a dressing amount during said selected period, means for again advancing the grinding wheel after said selected period toward the workpiece for fine grinding, and wheel position-compensating means for compensating a wheel position by a compensating amount as same as said dressing amount after fine grinding.